United States Patent
Yang

(10) Patent No.: US 7,259,972 B2
(45) Date of Patent: *Aug. 21, 2007

(54) PRIMARY-SIDE-CONTROL POWER CONVERTER HAVING A SWITCHING CONTROLLER USING FREQUENCY HOPPING AND VOLTAGE AND CURRENT CONTROL LOOPS

(75) Inventor: Ta-yung Yang, Taoyuan (TW)

(73) Assignee: System General Corporation (TW)

( * ) Notice: Subject to any disclaimer, the term of this patent is extended or adjusted under 35 U.S.C. 154(b) by 237 days.

This patent is subject to a terminal disclaimer.

(21) Appl. No.: 10/959,188

(22) Filed: Oct. 7, 2004

(65) Prior Publication Data

US 2006/0077697 A1    Apr. 13, 2006

(51) Int. Cl.
*H02M 3/335* (2006.01)

(52) U.S. Cl. ............................. 363/21.16; 323/21.13; 323/21.18; 323/97

(58) Field of Classification Search ............ 363/21.05, 363/21.08, 21.09, 21.1, 21.13, 21.16, 21.17, 363/21.18, 97, 131
See application file for complete search history.

(56) References Cited

U.S. PATENT DOCUMENTS

| | | | | |
|---|---|---|---|---|
| 5,032,967 A | * | 7/1991 | Marinus et al. | 363/21.13 |
| 5,901,051 A | * | 5/1999 | Takahashi et al. | 363/21.18 |
| 5,903,452 A | * | 5/1999 | Yang | 363/97 |
| 6,078,510 A | * | 6/2000 | Spampinato et al. | 363/21.13 |
| 6,118,675 A | * | 9/2000 | Lionetto et al. | 363/21.13 |
| 6,545,882 B2 | * | 4/2003 | Yang | 363/21.08 |
| 6,611,439 B1 | * | 8/2003 | Yang et al. | 363/41 |
| 6,661,679 B1 | * | 12/2003 | Yang et al. | 363/41 |
| 6,674,656 B1 | * | 1/2004 | Yang et al. | 363/21.1 |
| 6,721,192 B1 | | 4/2004 | Yang et al. | |
| 6,744,649 B1 | * | 6/2004 | Yang et al. | 363/98 |
| 6,836,415 B1 | * | 12/2004 | Yang et al. | 363/21.01 |
| 6,842,350 B2 | * | 1/2005 | Yamada et al. | 363/21.16 |
| 6,853,563 B1 | * | 2/2005 | Yang et al. | 363/21.15 |
| 6,862,194 B2 | | 3/2005 | Yang et al. | |
| 6,912,141 B2 | * | 6/2005 | Konno | 363/49 |
| 6,977,824 B1 | * | 12/2005 | Yang et al. | 363/21.16 |
| 7,016,204 B2 | * | 3/2006 | Yang et al. | 363/21.13 |
| 7,054,170 B2 | * | 5/2006 | Yang et al. | 363/21.18 |
| 7,061,225 B2 | * | 6/2006 | Yang et al. | 324/103 P |
| 7,061,780 B2 | * | 6/2006 | Yang et al. | 363/21.16 |
| 7,088,598 B2 | * | 8/2006 | Yang et al. | 363/21.01 |
| 2006/0055433 A1 | | 3/2006 | Yang et al. | |
| 2006/0056204 A1 | | 3/2006 | Yang et al. | |

* cited by examiner

*Primary Examiner*—Jeffrey Sterrett
(74) *Attorney, Agent, or Firm*—Finnegan, Henderson, Farabow, Garrett & Dunner LLP

(57) ABSTRACT

A power converter includes a switch and a controller. The switch switches electrical power in the power converter. The controller generates a switching signal to control the switch in response to a first feedback signal associated with a voltage control loop and a second feedback signal associated with a current control loop. The controller can also allow the switching frequency to hop from frequency to frequency according to a digital pattern.

51 Claims, 12 Drawing Sheets

PRIMARY-SIDE-CONTROL POWER CONVERTER HAVING A SWITCHING CONTROLLER USING FREQUENCY HOPPING AND VOLTAGE AND CURRENT CONTROL LOOPS

FIELD

The present invention relates generally to power converters and, more particularly, to a primary-side-control power converter having a switching controller using frequency hopping and voltage and current control loops.

BACKGROUND

Various power converters have been widely used to provide regulated output voltage and current. Typically, the power converters have a transformer that isolates the input and output terminals of the power converter for safety and reliability reasons. The input terminals at a primary-side can receive electrical power such that the transformer can pass the electrical power to the output terminals at a secondary-side. Most power converters use a switch to switch the electrical power through the transformer. In prior power converters, a controller controls the switch based on a feedback voltage signal from an optical-coupler coupled with an output voltage of the power converter. These prior power converters also required a secondary-side regulator to regulate the output voltage and current at the secondary-side of the power converter. A disadvantage of these prior power converters is that they required an optical-coupler and secondary-side regulator, thereby increasing the size and costs for the power converters.

Furthermore, in prior power converters, the switching of the electrical power through the transformer can cause electrical spikes and electromagnetic interference (EMI) in the power converters. Such prior power converters provided poor protection from spikes and EMI. Thus, what is needed is reducing the size and costs of power converters, while providing protection against electrical spikes and EMI.

SUMMARY

A power converter consistent with the invention comprises a switch, responsive to a switching signal, to control electrical power in the power converter; and a controller to generate the switching signal and to control the switching signal in response to a first feedback signal associated with a voltage control loop and a second feedback signal associated with a current control loop.

A method for regulating power in a power converter consistent with the invention comprises receiving electrical power from input terminals; and controlling a switching signal to regulate the connection of the electrical power to output terminals in response to a first feedback signal associated with a voltage control loop and a second feedback signal associated with a current control loop.

DRAWINGS

The accompanying drawings, which are incorporated in, and constitute a part of the specification, illustrate exemplary implementations of the invention and, together with the detailed description, serve to explain the principles of the invention. In the drawings, FIG. 1 illustrates one example of a schematic diagram of a primary-side-control power converter having a switching controller;

DETAILED DESCRIPTION

Reference will now be made in detail to exemplary implementations, which are illustrated in the accompanying drawings. Wherever possible, the same reference numbers will be used throughout the drawings to refer to the same or like parts.

The following examples and implementations overcome disadvantages of prior power converters and can reduce the size cost for power converters and electro-magnetic interference (EMI). According to one example, a power converter includes a switch and a controller. The switch switches electrical power in the power converter. The controller generates a switching signal to control the switch in response to a first feedback signal associated with a voltage control loop and a second feedback signal associated with a current control loop.

By using feedback signals associated with the voltage control loop and current control loop, a power converter can control the output voltage and the output current at the primary-side without the need of an optical-coupler or a secondary-side regulator. For example, one feedback signal is derived from an auxiliary voltage associated with an auxiliary winding of a transformer at a primary-side, and another feedback signal is derived from a sensed current passing through the switch. An optical-coupler is therefore not needed to generate a feedback voltage signal.

In other examples, the controller can generate a switching signal and allow the frequency of the switching signal to hop from frequency to frequency ("frequency hopping") according to a digital pattern, e.g., 1000100101 ... N. This pattern can be programmable, adjustable, and repeat itself. In certain examples, the pattern can be a fixed or variable length pattern. In this manner, the switch can turn on and off according to the digital pattern, e.g., the switching frequency can vary non-linearly, in order to reduce EMI and its effects in a power converter.

Figure 1:
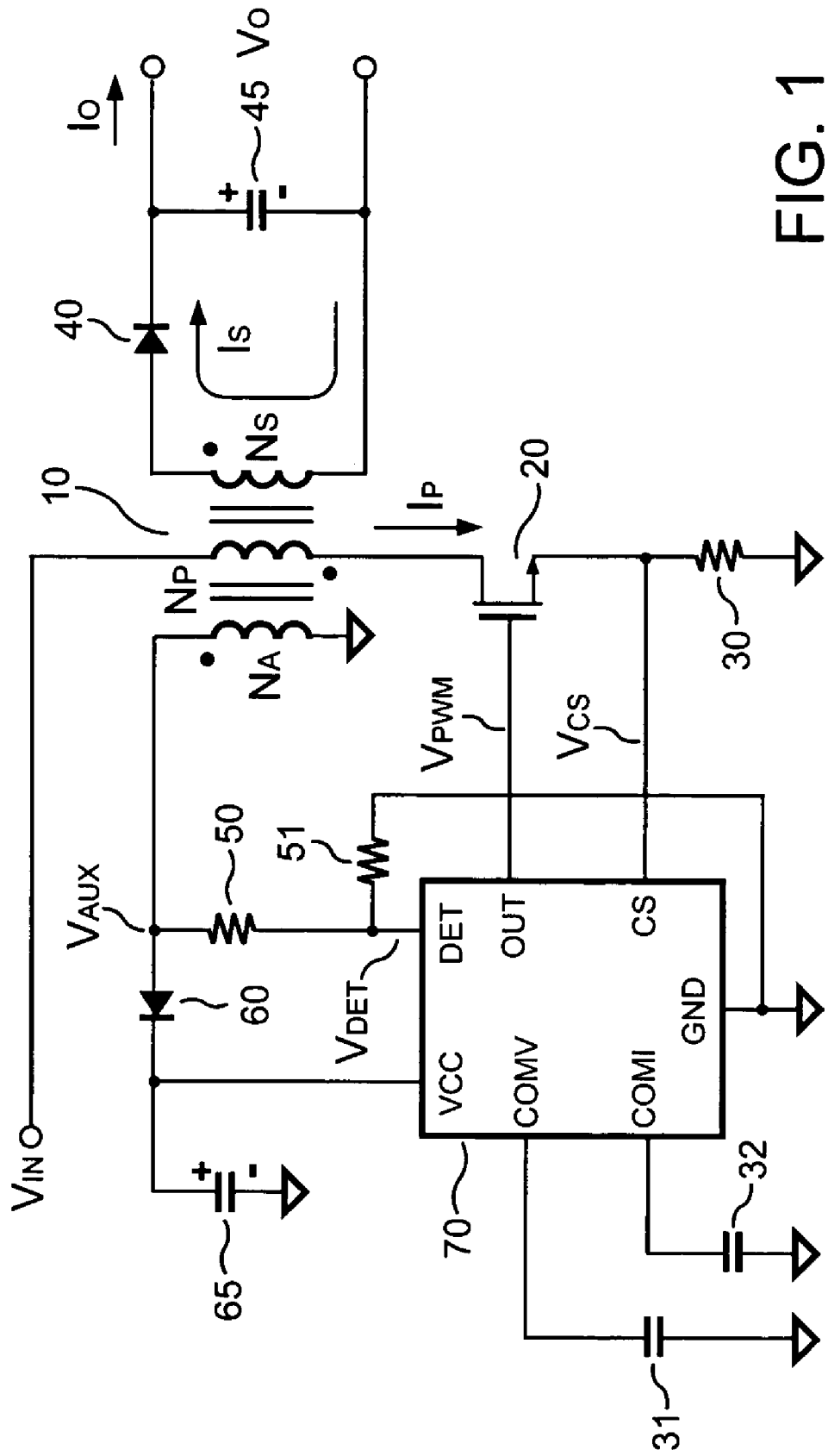

FIG. 1 illustrates one example of a schematic diagram of a primary-side-control power converter 100 having a switching controller 70. The power converter 100 includes a transformer 10 having an auxiliary winding $N_A$, a primary winding $N_P$, and a secondary winding $N_S$. The primary winding $N_P$ is coupled to receive the input voltage $V_{IN}$ of the power converter 100. In order to regulate electrical power or output power including an output voltage $V_O$ and an output current $I_O$, the switching controller 70 outputs a switching signal $V_{PWM}$ to a transistor 20 that switches the transformer 10, e.g., switching the electrical power flowing through the transformer 10. The switching signal $V_{PWM}$ has a switching frequency controlled by the switching controller 70.

The switching frequency of the switching signal $V_{PWM}$ dictates the frequency of electrical power flowing through the transformer 10. In this manner, the switching controller 70, using the switching signal $V_{PWM}$ and transistor 20, can regulate the electrical power or output power for power converter 100 by switching the power flow through the transformer 10. The power converter 100 also includes a current-sense resistor 30 coupled to the source terminal of the transistor 20 that serves as a current-sense device. This device allows the primary-side current $I_P$ flowing from the transformer 10 and through the transistor 20 to be sensed by the switching controller 70.

Figure 2:
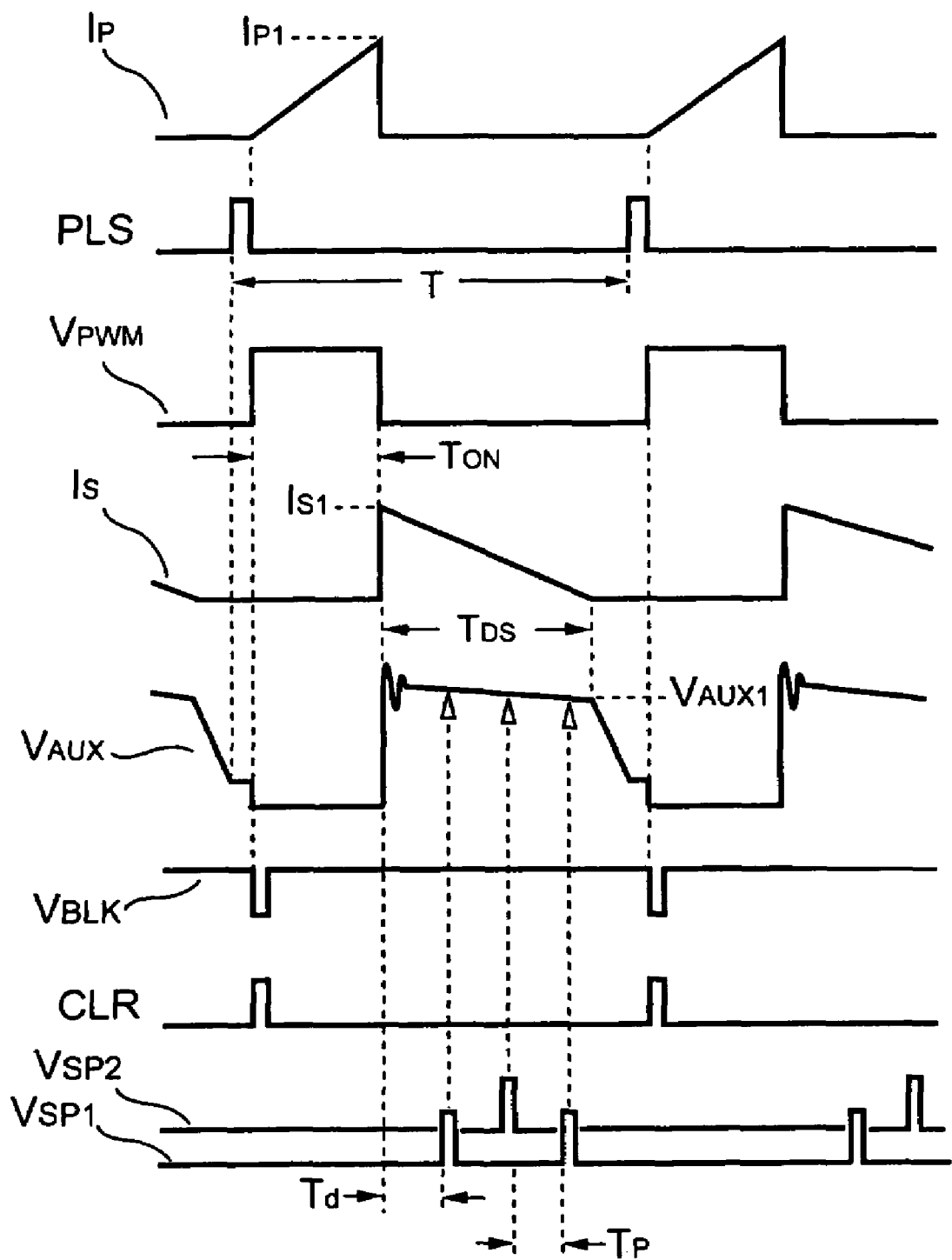
FIG. 2 illustrates example waveforms for the power converter and the switching controller of FIG. 1.

FIG. 2 illustrates example waveforms for the power converter 100 and the switching controller 70 of FIG. 1. When the switching signal $V_{PWM}$ is at a logic high, the primary-side current $I_p$ is generated and flows through the transistor 20. A primary-side switching peak current $I_{P1}$ can be determined by Equation 1 below:

$$I_{P1} = \frac{V_{IN}}{L_P} \times T_{ON}. \quad (1)$$

In Equation 1, $V_{IN}$ refers to the input voltage for the power converter 100, LP refers to the inductance of the primary winding $N_P$ of the transformer 10, and $T_{ON}$ refers to an on time of the switching signal $V_{PWM}$.

When the switching signal $V_{PWM}$ is off or at a logic low, the electrical energy or power stored in the transformer 10 is delivered to its secondary-side and to an output of the power converter 100 via a diode rectifier 40. As electrical energy or power is delivered to the secondary-side, a secondary-side switching current $I_S$ is generated in the power converter 100. The secondary-side switching peak current $I_{S1}$ can be determined by Equation 2 below:

$$I_{S1} = \frac{(V_O + V_F)}{L_S} \times T_{DS}. \quad (2)$$

In Equation 2, $V_O$ refers to the output voltage for the power converter 100, $V_F$ refers to the forward voltage drop of the diode rectifier 40, $L_S$ refers to the inductance of the secondary winding $N_S$ of the transformer 10, and $T_{DS}$ refers to the discharge time for the transformer 10. $T_{DS}$ can also refer to the discharge-time for the secondary-side switching current Is.

As electrical energy or power flows through the transformer 10, a voltage $V_{AUX}$ is generated at the auxiliary winding $N_A$ of the transformer 10. The peak auxiliary voltage $V_{AUX1}$ can be determined by Equation 3 below:

$$V_{AUX1} = \frac{T_{NA}}{T_{NS}} \times (V_O + V_F). \quad (3)$$

In Equation 3, $T_{NA}$ and $T_{NS}$ refer to the winding turns of the auxiliary winding $N_A$ and the secondary winding $N_S$, respectively, for the transformer 10. In this example, the voltage $V_{AUX}$ decreases as the secondary-side switching current $I_S$ falls to zero. If this occurs, the energy or power in the transformer 10 is considered to be fully released. Thus, as shown in FIG. 2, the discharge time $T_{DS}$ in Equation 2 can be measured from a falling edge of the switching signal $V_{PWM}$ to an edge or corner before a drop off in the $V_{AUX}$ voltage. The secondary-side switching peak current $I_{S1}$ is determined by the primary-side switching peak current $I_{P1}$ and the winding turns of the transformer 10. The secondary-side switching peak current $I_{S1}$ can be determined by Equation 4 below:

$$I_{S1} = \frac{T_{NP}}{T_{NS}} \times I_{P1}. \quad (4)$$

In Equation 4, $T_{NP}$ refers to the winding turns of the primary winding $N_P$ for the transformer 10. As shown in FIG. 1, the switching controller 70 includes a supply terminal VCC, a ground terminal GND, a detection terminal DET, an output terminal OUT, a current sense terminal CS, a voltage compensation terminal COMV, and a current compensation terminal COM1.

The VCC terminal and GND terminal provide electrical power for the switching controller 70, e.g., a VCC voltage. Resistors 50 and 51 form a divider circuit connected between the auxiliary winding $N_A$ of the transformer 10 and a ground reference level. The detection terminal DET is connected jointly with resistors 50 and 51. The voltage $V_{DET}$ applied at the DET terminal can be determined by Equation 5 below:

$$V_{DET} = \frac{R_{51}}{R_{50} + R_{51}} \times V_{AUX}. \quad (5)$$

In Equation 5, $R_{50}$ and $R_{51}$ refer to the resistance values for resistors 50 and 51. Accordingly, the $V_{DET}$ voltage is a ratio set forth by $R_{51}/(R_{50}+R_{51})$ multiplied with the $V_{AUX}$ voltage.

The voltage $V_{AUX}$ charges a capacitor 65 via a rectifier 60 that provides electrical power to the supply terminal VCC, which in turns powers the switching controller 70. The current-sense resistor 30 is connected from a source terminal of the transistor 20 to the ground reference level. This resistor 30 allows a current sense signal $V_{CS}$ to be derived from the primary-side switching current $I_P$ flowing through the transistor 20. The current sense terminal CS of the switching controller 70 receives the current sense signal $V_{CS}$. In this manner, the switching controller 70 can detect current passing through the transistor 20 from the transformer 10.

The output terminal OUT of the controller 70 provides the switching signal $V_{PWM}$ to the transistor 20 for switching the transformer 10, i.e., allowing electrical power to flow through the transformer 10. The voltage-compensation terminal COMV connects to a compensation network for voltage-loop frequency compensation. In this example, the compensation network includes a capacitor 31 connected to the ground reference level. The current-compensation terminal COMI connects to a similar compensation network as the COMV terminal, which includes a capacitor 32 connected to a ground reference level for current-loop frequency compensation. The manner in which the switching controller 70 uses these terminals will now be described.

Figure 3:
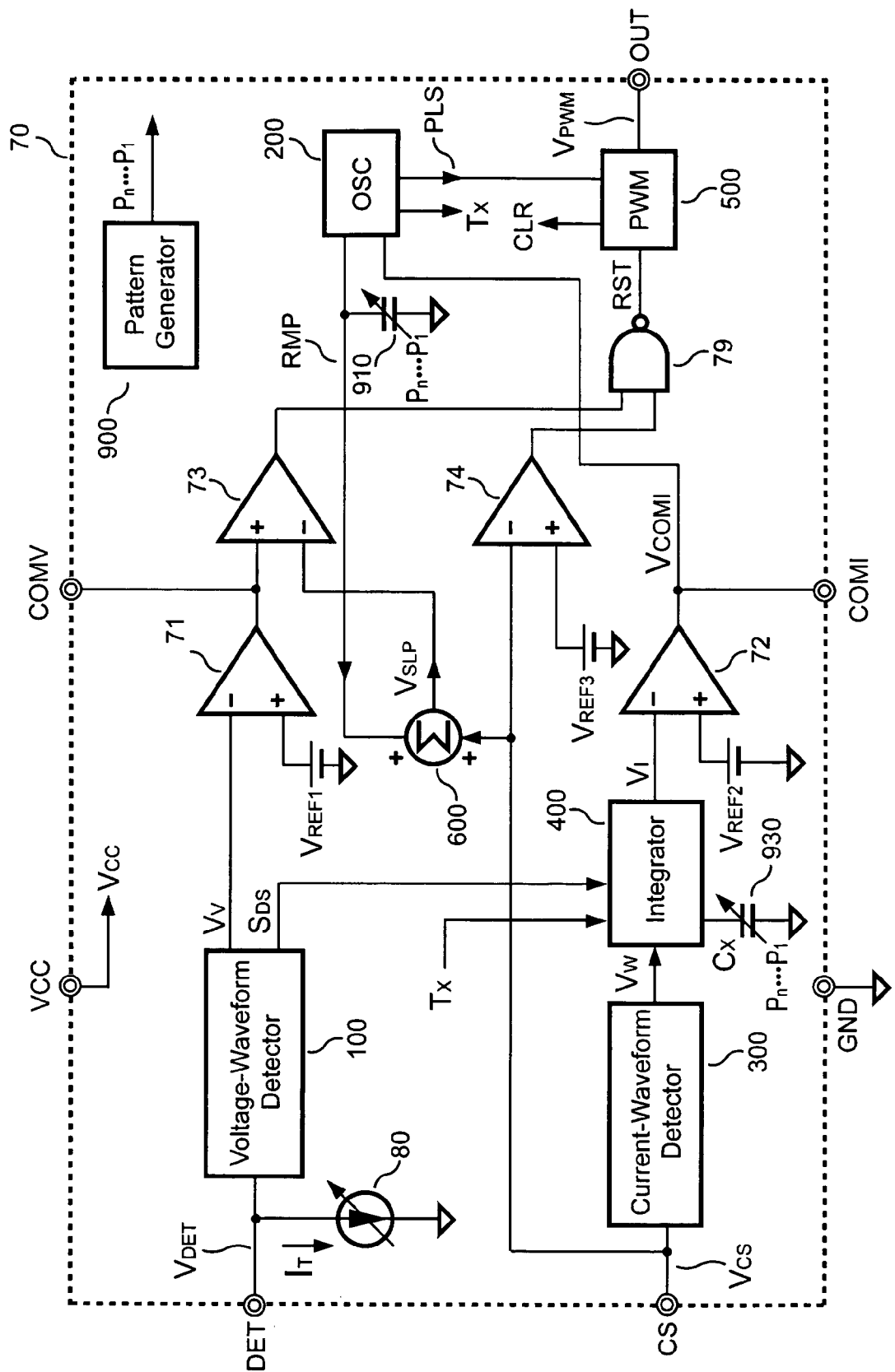
FIG. 3 illustrates one detailed example of the switching controller of FIG. 2.

FIG. 3 illustrates one detailed example of the switching controller 70 of FIG. 2. At the detection terminal DET, the switching controller includes a voltage-waveform detector 150 that produces a voltage-feedback signal $V_V$ and a discharge-time signal $S_{DS}$ by multiply sampling of the voltage $V_{DET}$ applied at the detection terminal DET. The discharge-time signal $S_{DS}$ represents the discharge-time $T_{DS}$ of the secondary-side switching current $I_S$. The voltage-waveform detector 150 outputs the feedback signal $V_V$ to a negative (−) input of an operational amplifier 71 and the discharge-time signal $S_{DS}$ to an integrator 400. The positive (+) terminal of the operational amplifier 71 receives a reference voltage $V_{REF1}$. Based on the inputs, the operational amplifier 71 can be used as a voltage-loop error amplifier for amplifying the voltage-feedback signal $V_V$ and providing a voltage loop gain for output voltage control.

At the current sense terminal CS, the switching controller 70 includes a current-waveform detector 300 that generates a current-waveform signal $V_W$ derived from the measured current signal $V_{CS}$. The current-waveform detector 300 outputs the current-waveform signal $V_W$ to the integrator 400. current-waveform signal $V_W$, the discharge-time signal $S_{DS}$, and a timing signal $T_X$. Based on the inputs, the integrator 400 produces a feedback signal $V_I$ by integrating an average-current signal with the discharge-time signal $S_{DS}$. The average-current signal is derived by integrating the current-waveform signal $V_W$ with the pulse width of the timing signal $T_X$. The integrator 400 outputs the feedback signal $V_I$ to a negative (−) input of an operational amplifier 72. The positive (+) input of the operational amplifier 72 receives a reference voltage $V_{REF2}$. Based on the inputs, the operational amplifier 72 can be used as a current-loop error amplifier for amplifying the current loop gain for output current control.

The output of the operational amplifier 72 connects with the current-compensation terminal COMI and an input of the oscillator 200. The osci generates a pulse signal PLS and the timing signal $T_X$ that feed into a pulse width modulation (PWM) circuit 500. The PWM circuit 500 uses the pulse signal PLS to initialize the switching signal $V_{PWM}$ and determine a switching frequency for the switching signal $V_{PWM}$. The pulse width of the timing signal $T_X$ correlates with the switching frequency of the switching signal $V_{PWM}$. The comparator 74 receives a reference voltage $V_{REF3}$ at its positive (+) input and the measured current signal $V_{CS}$ at its negative (−) input from the current sense terminal CS. The comparator 74 acts as a peak-current limiter to limit the primary-side switching peak current $I_{P1}$ in order to achieve a cycle-by-cycle current limiting function.

The PWM circuit 500 is coupled with comparators 73 and 74 through a NAND gate 79 to control the pulse width of the switching signal $V_{PWM}$ in response to the output of the voltage-loop error amplifier 71 and the output of the peak-current limit 74. Both operational amplifiers 71 and 72 can have trans-conductance outputs. The output of the operational amplifier 71 is coupled with the voltage-compensation terminal COMV and a positive (+) input of the comparator 73. The output of the operational amplifier 72 is coupled with current-compensation terminal COMI and the oscillator 200. The negative (−) input of the comparator 73 is coupled with an output of an adder 600. The adder 600 generates a slope signal $V_{SLP}$ by adding the current signal $V_{CS}$ with the ramp signal RMP. The added signals form a slope compensation for the voltage loop.

From the detection of the primary-side switching current $I_P$ to the control of the switching frequency of the switching signal $V_{PWM}$, the switching controller 70 forms a current control loop (as described above) to control the average value of the secondary-side switching current $I_s$ in response to the reference voltage $V_{REF2}$. According to the signal waveforms in FIG. 2, the output current 10 of the power converter 100 can be the average of the secondary-side switching current $I_S$. This average can be determined by Equation 6 below:

$$I_O = I_S \times \frac{T_{DS}}{2T}. \quad (6)$$

In Equation 6, T refers to the switching period of the switching signal that correlates to the time constant of the oscillator. The output current $I_O$ of the power converter 100 can thus be regulated. For example, the current-waveform detector 300 detects the current signal $V_{CS}$ at the current sense terminal CS and generates the current-waveform signal $V_W$. The integrator 400 further generates the feedback signal $V_I$ by integrating an average-current signal $V_{AV}$ with the discharge-time $T_{DS}$. The average-current signal $V_{AV}$ is generated by integrating the current-waveform signal $V_W$ with the pulse width of the timing signal $T_X$. The $V_I$ and $V_{AV}$ signals can be determined by Equations 7 and 8 below:

$$V_I = V_{AV} \times \frac{T_{DS}}{T_{I2}}. \quad (7)$$

$$V_{AV} = \frac{V_W}{2} \times \frac{T_{XP}}{T_{I1}}. \quad (8)$$

In Equation 8, the current-waveform signal $V_W$ can be determined by Equation 9 below:

$$V_W = \frac{T_{NS}}{T_{NP}} \times R_S \times I_{S1}. \quad (9)$$

In Equation 9, $T_{I1}$ and $T_{I2}$ refer to time constants for the integrator 400, and $T_{XP}$ refers to the pulse width of the timing signal $T_X$, which correlates with the switching period of the switching signal $V_{PWM}$. Thus, $T_{XP}$ can be expressed as $T_{XP} = \alpha T$. From Equations 6 through 9, the feedback signal $V_I$ can be determined by Equation 10 below:

$$V_I = \frac{\alpha T^2}{T_{I1} \times T_{I2}} \times \frac{T_{NS}}{T_{NP}} \times R_S \times I_O. \quad (10)$$

The feedback signal $V_I$ can thus be proportional to the output current $I_O$ for the power converter 100. In this manner, as the output current $I_O$ increases, the feedback signal $V_I$ will increase. However, in this example, the maximum value of the feedback signal $V_I$ is limited by the reference voltage $V_{REF2}$ value used for the regulation of the current control loop. Under feedback control of the current control loop, the switching frequency of the switching signal $V_{PWM}$ is reduced in response to the increase of the maximum output current $I_{O(max)}$ and vice versa. The maximum output current $I_{O(max)}$ can be determined by Equation 11 below:

$$I_{O(max)} = \frac{T_{NP}}{T_{NS}} \times \frac{G_A \times G_{SW} \times V_{REF2}}{1 + \left(G_A \times G_{SW} \times \frac{R_S}{K}\right)} \quad (11)$$

In Equation 11, K refers to a constant equal to $[(T_{f1} \times T_{f2})/(\alpha T^2)]$, $G_A$ is the gain of the current-loop error amplifier, and $G_{SW}$ refers to the gain of the switching circuit. As the loop gain of the current control loop is high ($G_A \times G_{SW} \gg 1$), the maximum output current $I_{O(max)}$ can be determined by Equation 12 below:

$$I_{O(max)} = K \times \frac{T_{NP}}{T_{NS}} \times \frac{V_{REF2}}{R_S}. \quad (12)$$

The maximum output current $I_{O(max)}$ of the power converter 100 is thus regulated as a constant current in response to the reference voltage $V_{REF2}$.

From the auxiliary voltage $V_{AUX}$ to the output of comparator 73, the switching controller 70 forms a voltage control loop. This control loop samples the voltage VAUX with pulse width modulation of the switching signal $V_{PWM}$, that controls the magnitude of the voltage signal $V_{AUX}$ in response to the reference voltage $V_{REF1}$. As shown by Equation 3 the voltage signal $V_{AUX}$ is a ratio of the output voltage $V_O$. Additionally, as shown by Equation 5, the detection voltage VDET can further attenuate the voltage signal VAUX. Regarding the detection voltage $V_{DET}$, the voltage-waveform detector 100 generates the voltage-feedback signal $V_V$ through multiply sampling of the detection voltage $V_{DET}$. By regulation of the voltage control loop, the value of the voltage-feedback signal $V_V$ can be controlled in response to the value of the reference voltage $V_{REF1}$. The voltage-loop error amplifier 71 and the PWM circuit 500 provide the loop gain for the voltage control loop. Thus, the output voltage $V_O$ for power converter 100 can be determined by Equation 13 below:

$$V_O = \left(\frac{R_{50} + R_{51}}{R_{51}} \times \frac{T_{NS}}{T_{NA}} \times V_{REF1}\right) - V_F. \quad (13)$$

The voltage-waveform detector 100 performs a multiply sampling of the voltage $V_{AUX}$. This voltage is sampled and measured instantly before the secondary-side switching current $I_S$ is discharged to zero. In this manner, the secondary-side switching current $I_S$ does not affect the value of the forward voltage drop $V_F$ across the diode rectifier 40 on the secondary-side. However, the voltage drop $V_F$ varies with changes in temperature.

In addition, at the detection terminal DET side, the switching controller 70 includes a programmable current source 80 that is coupled with an input of the voltage-waveform detector 100. The programmable current source 80 provides for temperature compensation and produces a programmable current $I_T$ in response to the temperature of the switching controller 70. The programmable current $I_T$, associated with the resistors 50 and 51, generates a voltage $V_T$ to compensate for temperature variations as a result of the forward voltage drop $V_F$. The voltage VT can be determined by Equation 14 below:

$$V_T = I_T \times \frac{R_{50} \times R_{51}}{R_{50} + R_{51}}. \quad (14)$$

Referring to the Equations 12 and 13, the ratio of resistors $R_{50}$ and $R_{51}$ can determine the output voltage $V_O$. Furthermore, the resistance of resistors $R_{50}$ and $R_{51}$ can determine the temperature coefficient for compensating the voltage drop $V_F$. Due to the programmable current source 80, Equation 12 can be rewritten as Equation 15 below:

$$V_O = \left(\frac{R_{50} + R_{51}}{R_{51}} \times \frac{T_{NS}}{T_{NA}}\right) \times (V_{REF1} + V_T) - V_F. \quad (15)$$

Figure 4:
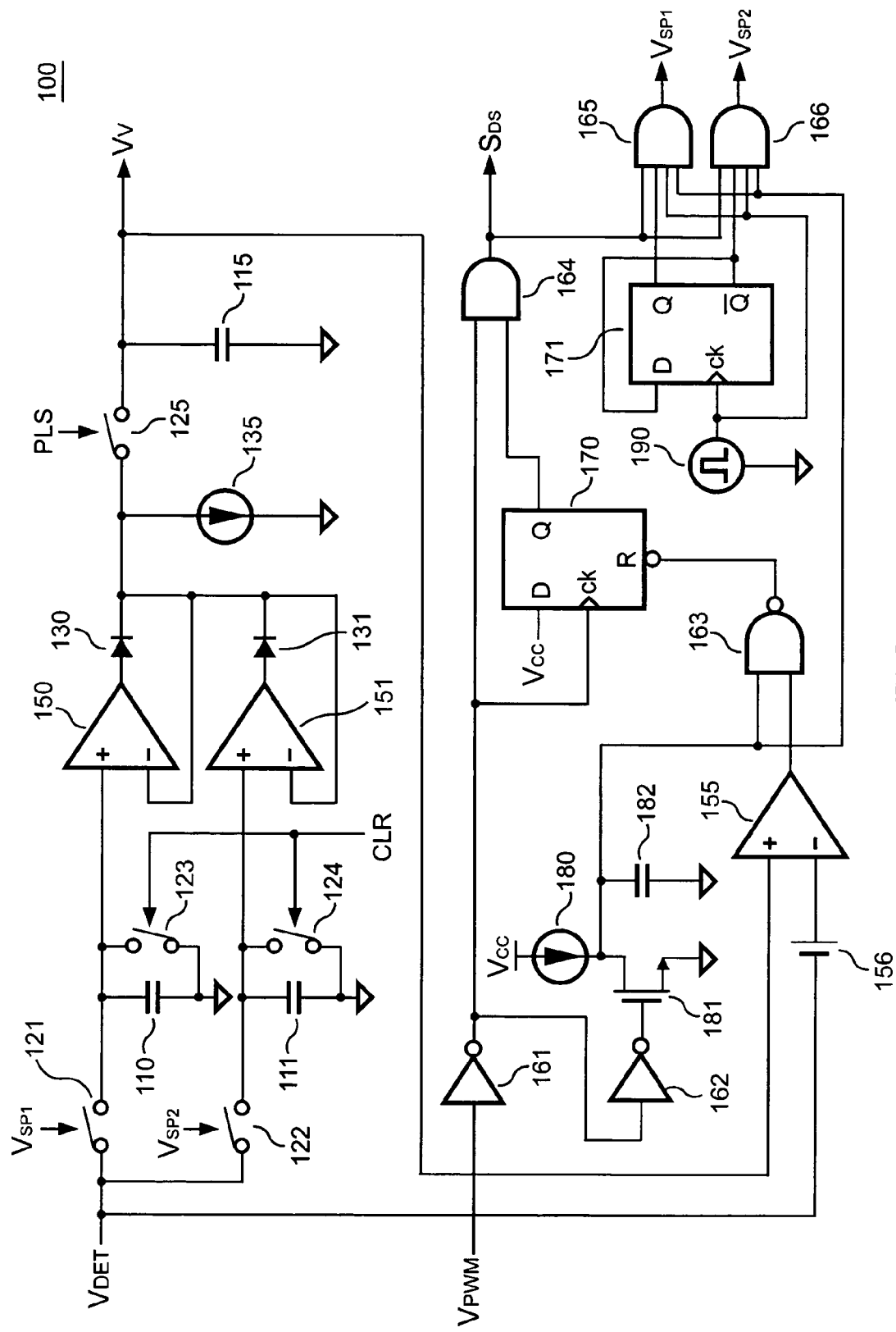
FIG. 4 illustrates one example of the voltage-waveform detector for the switching controller of FIG. 2.

FIG. 4 illustrates one example of the voltage-waveform detector 150 for the switching controller 70 of FIG. 2. The detector 150 includes a sample-pulse generator 190 that produces a sample-pulse signal for multiply sampling. An added voltage 156 increases the voltage signal $V_{AUX}$ from the detection terminal DET to produce a level-shift reflected voltage signal. This signal can act as a threshold signal for the comparator 155.

The detector 150 further includes a first signal generator having a D flip-flop 171 and two AND gates 165 and 166 for generating a first sample signal $V_{SP1}$ and a second sample signal $V_{SP2}$, respectively. The detector 150 also includes a second signal generator having a D flip-flop 170, a NAND gate 163, an AND gate 164, and a comparator 155 for generating the discharge-time signal $S_{DS}$.

The detector 150 further includes time delay circuitry that includes an inverter 162, a current source 180, a transistor 181, and a capacitor 182 for generating a time delay time $T_d$, as the switching signal $V_{PWM}$ is disabled. The inverter 161 receives the switching signal $V_{PWM}$ as an input. The output of the inverter 161 feeds into an input of an inverter 162, an input of the AND gate 164, and a clock-input of the D flip-flop 170. The output of the inverter 162 feeds into a transistor 181 that turns the transistor on and off. The capacitor 182 is connected in parallel with the transistor 181. The current source 180 is applied to charge the capacitor 182. Therefore the current from the current source 180 and the capacitance of the capacitor 182 dictate the delay time $T_d$ for the time-delay circuit. The output of the capacitor 182 is the output of the time-delay circuit.

The detector 150 also includes a D flip-flop 170 receiving the supply voltage $V_{CC}$ at its D-input. The output of the D flip-flop 170 feeds into a second input of the AND gate 164, the first input being coupled with the output of the inverter 161. The AND gate 164 outputs the discharge-time signal $S_{DS}$. In this example, the discharge-time signal $S_{DS}$ is enabled when the switching signal $V_{PWM}$ is disabled. The reset input of the D flip-flop 170 is coupled with the output of the NAND gate 163. The inputs of the NAND gate 163 receive the output of the time-delay circuit (i.e., voltage from the capacitor 182) and the output of the comparator 155. The comparator 155 receives the level-shift reflected signal at its negative (−) input and receives the voltage-feedback signal $V_V$ at its positive (+) input. In this example, after the delay time $T_d$, the discharge-time signal $S_{DS}$ can be disabled when the level-shift reflected signal is lower than the voltage-feedback signal $V_V$. The discharge-time signal $S_{DS}$ can also be disabled as long as the switching signal $V_{PWM}$ is enabled.

The clock input of the D flip-flop 171 receives the sample-pulse signal, as well as inputs for AND gates 165 and 166. The D-input and an inverse output of the D flip-flop 171 are connected together to form a divide-by-two counter. The inverse output of the D flip-flop 171 also feeds into inputs of the AND gates 165 and 166, as well as the discharge-time signal $S_{DS}$. The AND gates 165 and 166 are receive at its inputs the output of the time-delay circuit from capacitor 182.

In this example, based on the above combinational circuitry, the first sample signal $V_{SP1}$ and the second sample signal $V_{SP2}$ are generated in response to the sample-pulse signal $V_{PWM}$. Additionally, the first sample signal $V_{SP1}$ and the second sample signal $V_{SP2}$ can be alternately generated during an enabled period of the discharge-time signal $S_{DS}$. Furthermore, the delay time $T_d$ can be inserted at the beginning of the discharge-time signal $S_{DS}$ to inhibit the first sample signal $V_{SP1}$ and the second sample signal $V_{SP2}$. The first sample signal $V_{SP1}$ and the second sample signal $V_{SP2}$ can thus be disabled during the period of the delay time $T_d$.

The first sample signal $V_{SP1}$ and the second sample signal $V_{SP2}$ can be used for alternately sampling the voltage signal $V_{AUX}$ via the detection terminal DET and the divider. The first sample signal $V_{SP1}$ and the second sample signal $V_{SP2}$ control switches 121 and 122, respectively, for obtaining a first hold voltage and a second hold voltage across capacitors 110 and 111, respectively. Connected in parallel with the capacitor 110 is a switch 123 to discharge the capacitor 110. Similarly, connected in parallel with the capacitor 111 is a switch 124 to discharge the capacitor 111.

The detector 150 also includes buffer amplifier circuitry. Such circuitry includes operational amplifiers 150 and 151, diodes 130 and 131, and a current source 135 for generating a hold voltage. The operational amplifiers 150 and 151 receive the outputs of capacitors 110 and 111, respectively, at their positive (+) inputs. The outputs of the operational amplifiers 150 and 151 feed into their respective negative (−) inputs. The diodes 130 and 131 are connected at the outputs of respective operational amplifiers 150 and 151. The hold voltage can be obtained from the higher voltage of the first-hold voltage or the second-hold voltage. The current source 135 can be used for termination of the hold voltage. Connected with the current source 135 is a switch 125 that periodically samples the hold voltage to a capacitor 115. The sampled hold voltage generates the voltage-feedback signal $V_V$. The switch 125 turns on and off by the pulse signal PLS. The first sample signal $V_{SP1}$ and the second sample signal $V_{SP2}$ start to generate the first-hold voltage and the second-hold voltage after the delay time $T_d$, which eliminates the spike interference of the voltage signal $V_{AUX}$. The spike interference of the voltage signal $V_{AUX}$ can be generated as a result of the switching signal $V_{PWM}$ being disabled and the transistor 20 being turned off.

The comparator 155 detects if the voltage signal $V_{AUX}$ starts to decrease, as the secondary-side switching current $I_S$ discharges to zero, for disabling the discharge-time signal $S_{DS}$. The pulse width of the discharge-time signal $S_{DS}$ is therefore correlated to the discharge-time $T_{DS}$ of the secondary-side switching current $I_S$. The first sample signal $V_{SP1}$ and the second sample signal $V_{SP2}$ can be disabled, and the multiply sampling can be stopped in response to the disable of the discharge-time signal $S_{DS}$. In such a case, the hold voltage at the output of the buffer amplifier can represents an end voltage. The end voltage thus correlates to the voltage signal $V_{AUX}$ that is sampled just before the secondary-side switching current $I_S$ falls to zero. The hold voltage is obtained from the higher voltage of the first hold voltage and the second hold voltage, which will ignore the voltage that is sampled when the voltage signal starts to decrease.

Figure 5:
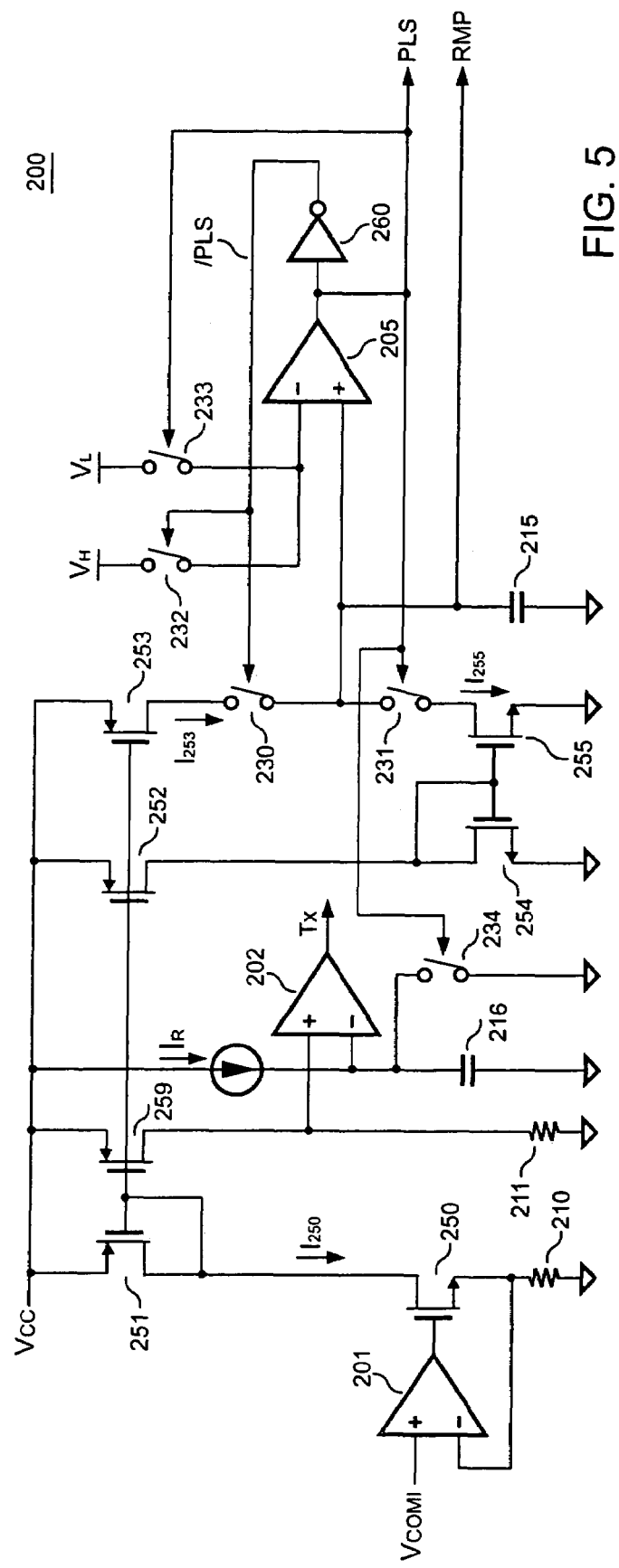
FIG. 5 illustrates one example of the oscillator for the switching controller of FIG. 2.

FIG. 5 illustrates one example of the oscillator 200 for the switching controller 70 of FIG. 2. The oscillator 200 includes a first V-to-I converter having an operational amplifier 201, a resistor 210, and a transistor 250. This first V-to-I converter generates a reference current $I_{250}$ in response to the output voltage of the current-loop error amplifier $V_{COMI}$. Through the feedback loop control, the reference voltage VREF2 can regulate the output voltage of the current-loop error amplifier VCOMI.

The oscillator 200 also includes a plurality of transistors, such as 251, 252, 253, 254, 255 and 259 that form current mirrors to generate oscillator charge currents $I_{253}$, $I_{255}$, and a timing current $I_{259}$ in response to the reference current $I_{250}$. The drain of transistor 253 generates the oscillator charge current $I_{253}$. The drain of transistor 255 generates the oscillator discharge current $I_{255}$. The drain of transistor 259 generates the timing current $I_{259}$. Connected between the drain of the transistor 253 and a capacitor 215 is a switch 230. Connected between the drain of the transistor 255 and the capacitor 215 is a switch 231. The ramp signal RMP is obtained from the capacitor 215. The comparator 205 has a positive (+) input connected to the capacitor 215 and outputs the pulse signal PLS.

The pulse signal PLS determines the switching frequency for the power converter 100. This can include determining the switching frequency of the electrical power flow through the transformer 10 or determining the switching frequency of output electrical power of the power converter 100. The output electrical power can include parameters associated with the output voltage and output current of the power converter 100.

The oscillator 200 also includes switches 232 and 233 having terminals that connect, respectively, with high and low threshold voltages ($V_H$ and $V_L$) and a positive (+) input of a comparator 205. The negative (−) input of the comparator 205 connects in between the switches 230 and 231. The output of the comparator 205 provides the pulse signal PLS and feeds into an input of an inverter 260 that generates an inverse of the pulse signal PLS.

The pulse signal PLS turns on and off the switches 231 and 233. The inverse pulse signal PLS turns on and off switches 230 and 232. Referring to FIG. 3, the programmable capacitor 910 connects in parallel with the capacitor 215 for modulating the switching frequency in accordance with the digital pattern $P_N..P_1$. In certain examples, the digital pattern can be a fixed or variable length pattern including zeroes and ones, e.g., 1000100101 and so on. In particular, the switching frequency can be modulated in a "frequency hopping" manner. That is, the switching frequency can hop from one frequency to another frequency according to the digital pattern. Moreover, the digital pattern can be programmable and adjustable, which can vary the switching frequency non-linearly. Frequency hopping of the switching frequency can reduce EMI and its effects in the power converter 100.

The resistance $R_{210}$ for the resistor 210, the capacitance $C_{215}$ for the capacitor 215, and the capacitance $C_{910}$ for the first programmable capacitor 910 can determine the switching period T of the switching frequency for the power converter 100. The switching period can be determined by Equation 17 below:

$$T = \frac{(C_{215} + C_{910}) \times V_{OSC}}{V_{COMI}/R_{210}} = R_{210} \times (C_{215} + C_{910}) \times \frac{V_{OSC}}{V_{COMI}}. \quad (17)$$

In Equation 17, $V_{OSC} = V_H - V_L$ and the capacitance $C_{910}$ of the first programmable capacitor 910 is varied in response to the change of the digital pattern $P_N..P_1$.

The oscillator 200 also includes a resistor 211 and timing current $I_{259}$ to generate a trip-point voltage on the resistor 211. The comparator 202 receives the trip-point voltage at its positive (+) input. At the negative (−) input of the comparator 202, a constant current source $I_R$ charges a capacitor 216 in which the output of the capacitor 216 feeds into negative (−) input of the comparator 202. Connected in parallel to the capacitor 216 is a switch 234 for discharging the capacitor 216 in response to the pulse signal PLS. Based on these inputs, the comparator 202 generates the timing signal $T_X$. Because the capacitor 216 correlates with the capacitor 215, the timing signal $T_X$ can thus correlate with the switching period T of the switching frequency.

Figure 6:
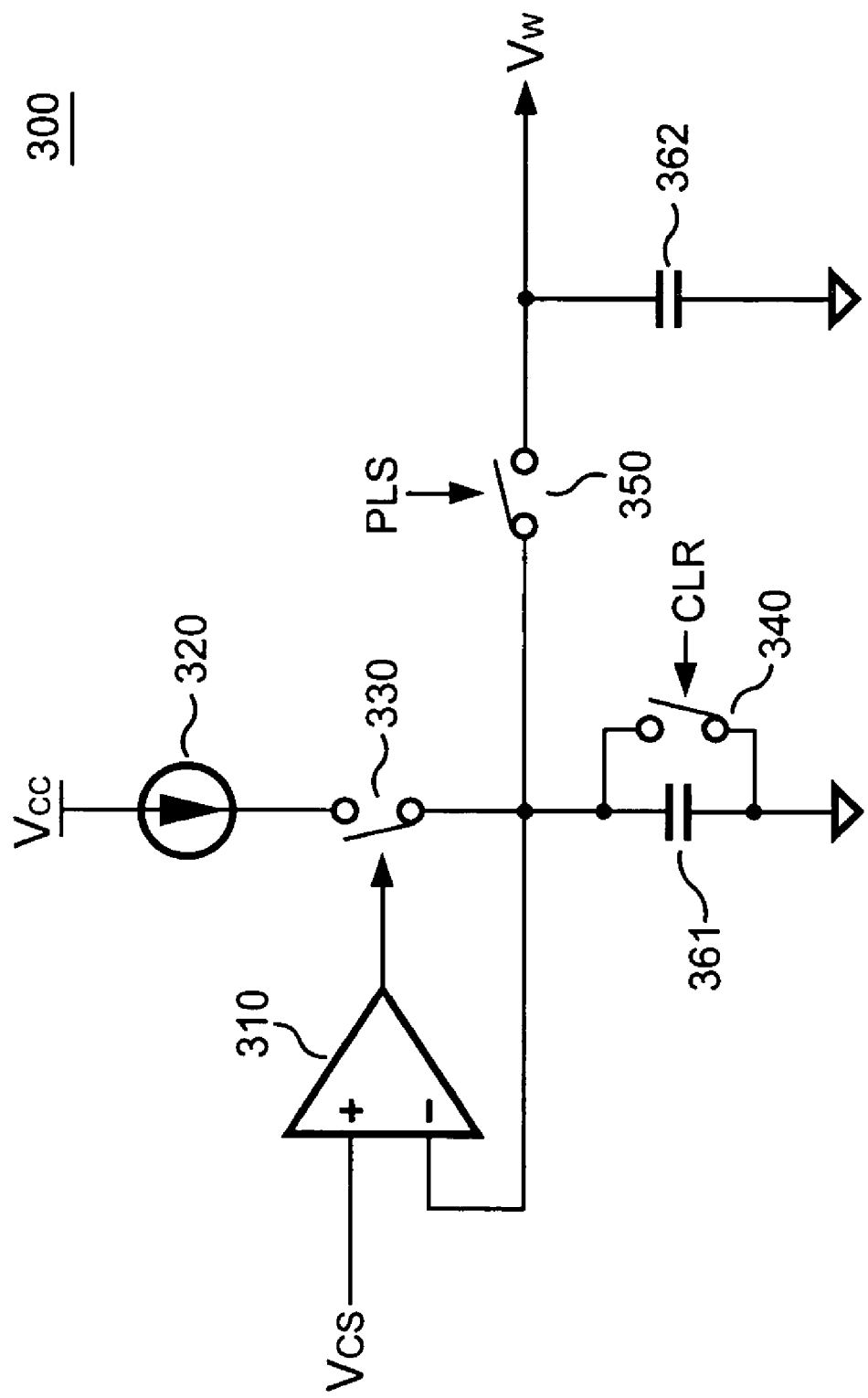
FIG. 6 illustrate one example of the current-waveform detector for the switching controller of FIG. 2.

FIG. 6 illustrates one example of the current-waveform detector 300 for the switching controller 70 of FIG. 2. The detector 300 includes a comparator 310, a current source 320, switches 330, 340, and 350, and capacitors 361 and 362. The detector 300 can sample peak value of the current signal $V_{CS}$ for generating a peak-current signal. The comparator 310 receives the current signal $V_{CS}$ at its positive (+) input and receives an output of the capacitor 361 at its negative (−) input. Connected between the current source 320 and the capacitor 361 is the switch 330. The output of the comparator 310 turns on and off the switch 330. Connected in parallel with the capacitor 361 is the switch 340 for discharging the capacitor 361. The switch 350 periodically samples the peak-current signal to a capacitor 362, which generates the current-waveform signal $V_W$. The pulse signal PLS turns on and off the switch 350.

Figure 7:
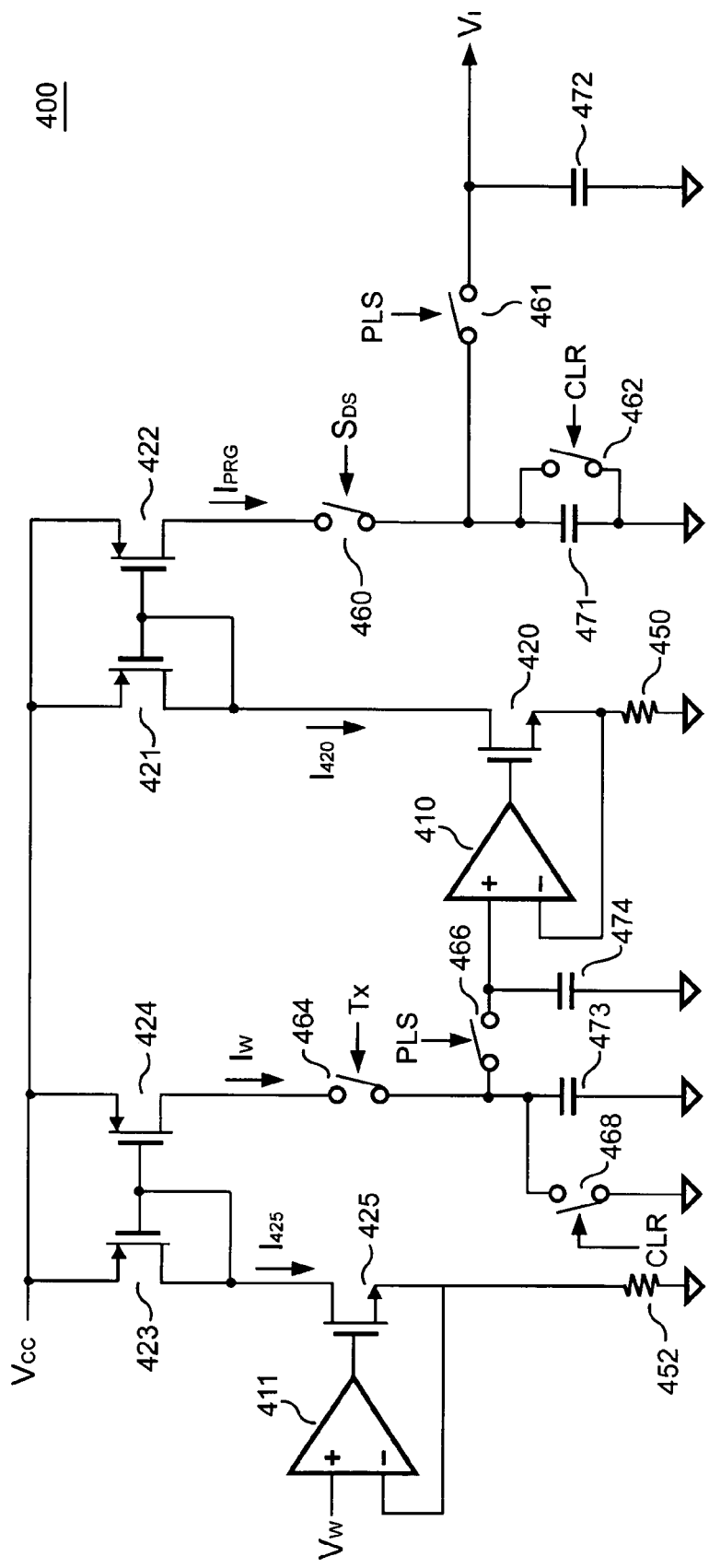
FIG. 7 illustrates one example of the integrator for the switching controller of FIG. 2.

FIG. 7 illustrates one example of the integrator 400 for the switching controller 70 of FIG. 2. The integrator 400 includes a V-to-I converter that uses an operational amplifier 411, a resistor 452, and transistors 423, 424, and 425. The operational amplifier 411 receives the current-waveform signal $V_W$ at its positive (+) input. The negative (−) input of the operational amplifier 411 is connected to the resistor 452. The output of the operational amplifier 411 drives a gate of the transistor 425. The source terminal of the transistor 425 is coupled to the resistor 452. This V-to-I converter generates a current $I_{425}$ that passes from the drain terminal of the transistor 425 in response to the current-waveform signal $V_W$. Transistors 423 and 424 form a current mirror having a 2:1 ratio. The current mirror is driven by the current $I_{425}$ that generates a programmable charge current $I_W$ via the drain terminal of the transistor 424. The programmable charge current $I_W$ can be determined by Equation 18 below:

$$I_W = \frac{1}{R_{452}} \times \frac{V_W}{2}. \quad (18)$$

In Equation 18, $R_{452}$ refers to the resistance for the resistor 452. The capacitor 473 produces a first-integrated signal. Connected between the drain terminal of the transistor 424 and the capacitor 473 is a switch 464. The timing signal TX turns on and off the switch 464. Connected in parallel with the capacitor 473 is a switch 468 for discharging the capacitor 473. The switch 466 periodically samples the first-integrated signal to a capacitor 474 for producing the average-current signal $V_{AV}$. The pulse signal PLS turns on and off the switch 466. The average-current signal $V_{AV}$ can be determined based on the voltage at the capacitor 474. In particular, the average-current signal $V_{AV}$ can be determined by Equation 19 below:

$$V_{AV} = \frac{1}{R_{452} \times C_{473}} \times \frac{V_W}{2} \times T_{XP}. \quad (19)$$

The integrator 400 includes another V-to-I converter using an operational amplifier 410, a resistor 450, and transistors 420, 421, 422. The operational amplifier 410 receives the average-current signal $V_{AV}$ at its positive (+) input. The negative input (−) of the operational amplifier 410 is connected to the resistor 450. The output of the operational amplifier 410 drives a gate of the transistor 420. The source terminal of the transistor 420 is coupled to the resistor 450. In this example, this V-to-I converter generates a current $I_{420}$ that passes from the drain terminal of the transistor 420 in response to the average-current signal $V_{AV}$. Transistors 421 and 422 form a current mirror. The current mirror is driven by the current $I_{420}$ to produce a programmable charge current $I_{PRG}$ via the drain terminal of the transistor 422. The programmable charge current $I_{PRG}$ can be determined by Equation 20 below.

$$I_{PRG} = \frac{V_{AV}}{R_{450}}. \quad (20)$$

In Equation 20, $R_{450}$ refers to the resistance for the resistor 450. The capacitor 471 produces an integrated signal. Connected between the drain of the transistor 422 and the capacitor 471 is a switch 460. The discharge-time signal $S_{DS}$ turns on and off switch 460. Connected in parallel with the capacitor 471 is a switch 462 for discharging the capacitor 471. The programmable capacitor 930 is connected in parallel with the capacitor 471 at a $C_X$ terminal of the integrator 400 for correlating the time constant of the integrator 400 with the switching frequency. The capacitance $C_{930}$ of the programmable capacitor 930 is varied in response to the change of the digital pattern $P_N..P_1$. The switch 461 periodically samples the integrated signal to a capacitor 472 for producing the feedback signal $V_I$. The pulse signal PLS turns on and off the switch 461. The feedback signal $V_I$ is can therefore be obtained across the capacitor 472, and determined by Equation 21 below:

$$V_I = \frac{V_{AV}}{R_{450} \times (C_{471} + C_{930})} \times T_{DS}. \quad (21)$$

According to the Equations 4 through 9 and 17, the feedback signal $V_I$ correlates to the secondary-side switching current $I_S$ and the output current $I_O$ of the power converter 100. In this manner, Equation 10 can be rewritten as Equation 22 below:

$$V_I = m \times \frac{T_{NS}}{T_{NP}} \times R_S \times I_O. \quad (22)$$

In Equation 22, m is a constant which can be determined by Equation 23 below:

$$m = \frac{\alpha \times [R_{210} \times (C_{215} + C_{910})]^2}{[R_{452} \times C_{473}] \times [R_{450} \times (C_{471} + C_{930})]} \times \frac{V_{OSC}}{V_{COMI}}. \qquad (23)$$

In Equation 23, the resistance $R_{450}$ and $R_{452}$ for the resistors 450 and 452 correlate to the resistance $R_{210}$ for the resistor 210. The capacitance $C_{471}$ and $C_{473}$ for the capacitors 471 and 473 and the capacitance $C_{930}$ for the capacitor 930 correlate to the capacitance $C_{215}$ for the capacitor 215 and the capacitance $C_{910}$ for the capacitor 910. In this manner, the feedback signal $V_I$ can be proportional to the output current $I_O$ of the power converter 100.

Figure 12:
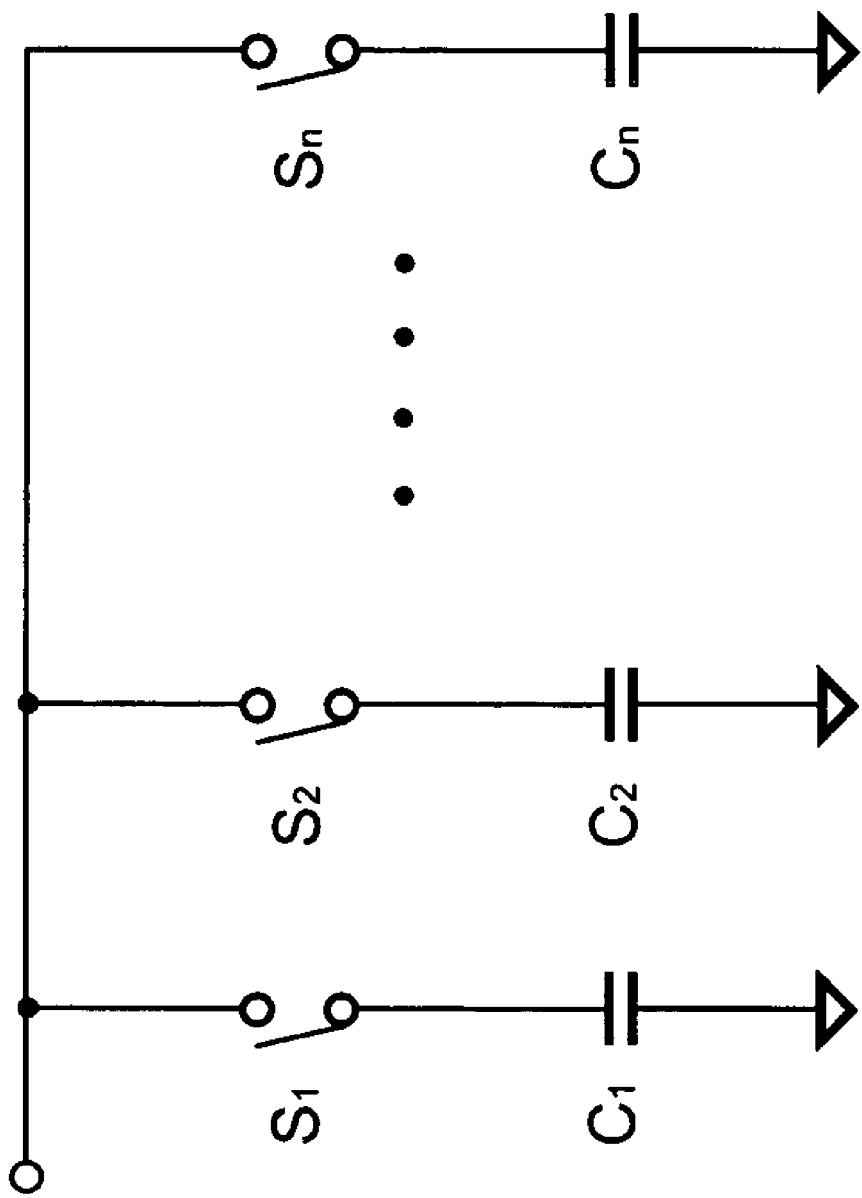
FIG. 12 illustrates one example of the programmable capacitor for the switching controller of FIG. 2.

FIG. 12 illustrates one example of the programmable capacitors 910 and 930 for the switching controller 70 of FIG. 2. These programmable capacitors include switching-capacitor sets connected in parallel. Referring to FIG. 12, capacitors $C_1, C_2, \ldots C_n$ connect with respective switches $S_1, S_2, \ldots S_n$ in series. For example, the switch $S_1$ connects with the capacitor $C_1$ in series and so on. The digital pattern code $P_N..P_1$ turns on and off the switches $S_1, S_2, \cdot\cdot S_n$ and can therefore change the capacitance for the programmable capacitors.

Figure 8:
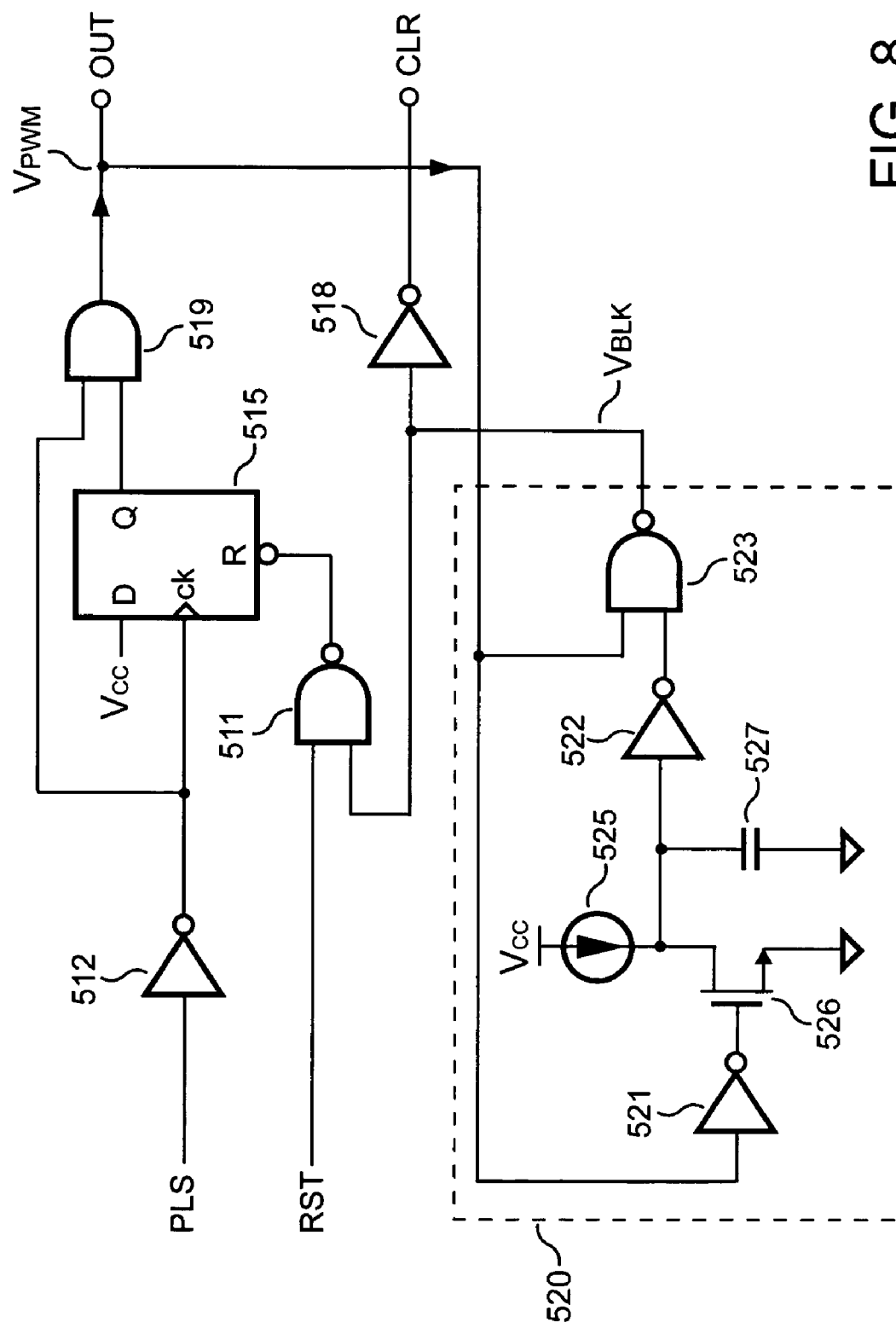
FIG. 8 illustrates one example of the circuit schematic of the PWM circuit for the switching controller of FIG. 2.

FIG. 8 illustrates one example of the circuit schematic of the PWM circuit 500 for the switching controller 70 of FIG. 2. The PWM circuit 500 includes a NAND gate 511, a D flip-flop 515, an AND gate 519, a blanking circuit 520, and inverters 512 and 518.

The D flip-flop 515 receives at its D-input the supply voltage $V_{CC}$ and is pulled high. The inverter 512 receives the pulse signal PLS at its input. The output of the inverter 512 feeds into the clock input of the D flip-flop 515 for enabling the switching signal $V_{PWM}$. The AND gate 519 receives at its inputs the output of the D flip-flop 515 and the output of the inverter 512. The AND gate 519 outputs the switching signal $V_{PWM}$ to the transistor 20 of the power converter 100.

The D flip-flop 515 receives at its reset input the output of the NAND gate 511. The NAND gate 511 receives the reset signal RST at an input for cycle-by-cycle disabling of the switching signal $V_{PWM}$. At another input, the NAND gate 511 receives an output of the blanking circuit 520 for ensuring a minimum on-time of the switching signal $V_{PWM}$ once the switching signal $V_{PWM}$ is enabled. The minimum on-time of the switching signal $V_{PWM}$ can ensure a minimum discharge-time $T_{DS}$, which can allow a proper multiply sampling for the sampling voltage signal $V_{AUX}$ in the voltage-waveform detector 100.

The discharge-time $T_{DS}$ can be related to the on-time $T_{ON}$ of the switching signal $V_{PWM}$. Referring to Equations 1, 2, and 4 and the secondary inductance $L_S=(T_{NS}/T_{NP})^2 \times L_P$, the discharge-time $T_{DS}$ can be determined by Equation 24 below:

$$T_{DS} = \left(\frac{V_{IN}}{V_O + V_F}\right) \times \frac{T_{NS}}{T_{NP}} \times T_{ON}. \qquad (24)$$

Referring to FIG. 8, the blanking circuit 520 receives at an input the switching signal $V_{PWM}$. In one example, when the switching signal $V_{PWM}$ is enabled, the blanking circuit 520 can generate a blanking signal $V_{BLK}$ to inhibit the reset of the D flip-flop 515. The blanking circuit 520 includes a NAND gate 523, a current source 525, a capacitor 527, a transistor 526, and inverters 521 and 522.

The inverter 521 and the NAND gate 523 receives at an input the switching signal $V_{PWM}$. The current source 525 charges capacitor 527. The transistor 526 connects in parallel with the capacitor 527. The output of the inverter 521 turns on and off the transistor 526. The inverter 522 receives at its input an output of the capacitor 527. The output of the inverter 522 feeds into an input of the NAND gate 523. Based on its inputs, the NAND gate 523 outputs the blanking signal $V_{BLK}$. The current from the current source 525 and the capacitance of the capacitor 527 determine the pulse width of the blanking signal $V_{BLK}$. The inverter 518 receives at its input the output of the NAND gate 523. The inverter 518 outputs a clear signal CLR to turn on and off the switches 123, 124, 340 and 462.

Figure 9:
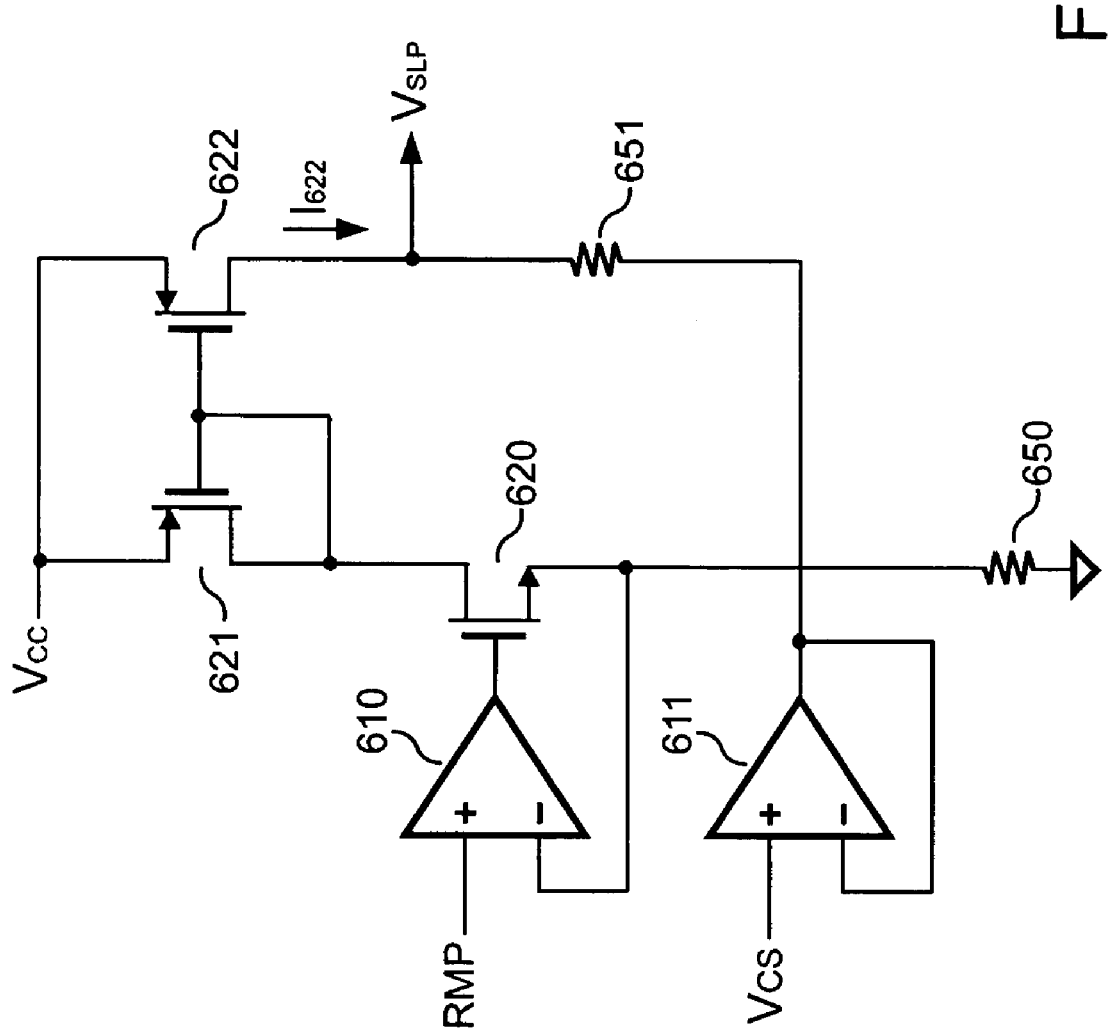
FIG. 9 illustrates one example of a circuit schematic of the adder for the switching controller of FIG. 2.

FIG. 9 illustrates one example of a circuit schematic of the adder 600 for the switching controller 70 of FIG. 2. The adder 600 includes an operational amplifier 610, transistors 620, 621, 622, and a resistor 650 used for another V-to-I converter that generates a current $I_{622}$ in response to the ramp signal RMP. The operational amplifier 611 receives at its positive (+) input the current signal $V_{CS}$. The output of the operational amplifier 611 is connected to its negative (−) input. In this example, the operation amplifier 611 can act as buffer. The drain terminal of the transistor 622 is connected to the output of the operational amplifier 611 via a resistor 651. The slope signal $V_{SLP}$ is generated at the drain terminal of the transistor 622. The slope signal $V_{SLP}$ can thus correlate to the ramp signal RMP and the current signal $V_{CS}$.

Figure 10:
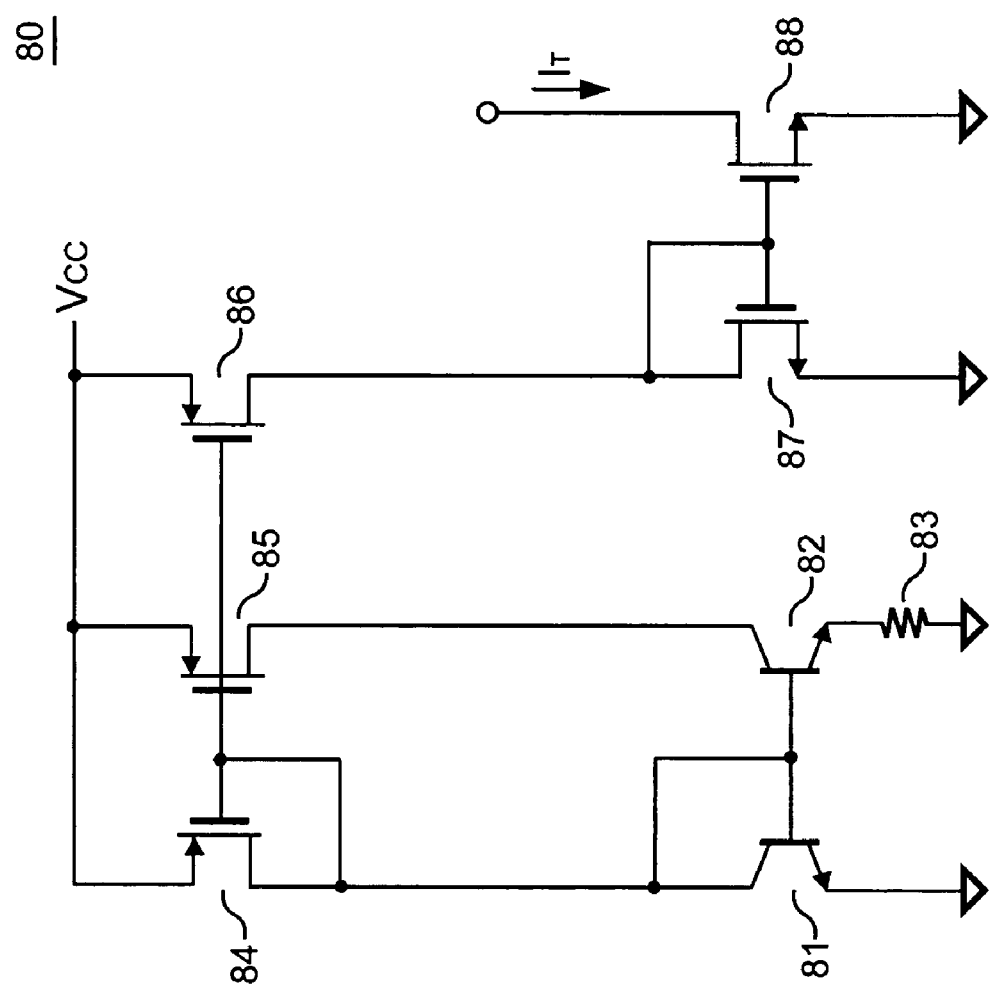
FIG. 10 illustrates one example of a circuit schematic of the programmable current source for the switching controller of FIG. 2.

FIG. 10 illustrates one example of a circuit schematic of the programmable current source 80 for the switching controller 70 of FIG. 2. The programmable current source 80 generates the programmable current $I_T$ in response to temperature variations. The programmable current generator 80 includes two bipolar transistors 81 and 82, three p-mirror transistors 84, 85, and 86, two n-mirror transistors 87 and 88, and a resistor 83. The programmable current $I_T$ can be determined by Equation 25 below:

$$I_T = N_M \times \frac{k \times T_{emp}}{q} \times \frac{\ln(r)}{R_T}. \qquad (25)$$

In Equation 25, $R_T$ is the resistance for the resistor 83, $NM=M_1 \times M_2$; $M_1$ is the geometrical ratio for the transistors 85 and 86, $M_2$ is the geometrical ratio of the transistor 87 and 88, k is the Boltzmann's constant, q is the charge on an electron, r is the emitter area ratio for the bipolar transistors 81 and 82, and $T_{emp}$ is the transistor temperature.

Furthermore, in order to produce frequency hopping for reducing the electro-magnetic interference (EMI) for the power converter 100, the pattern generator 900 generates a digital pattern $P_N..P_1$. The programmable capacitor 910 is coupled to the oscillator 200 and the pattern generator 910 for modulating the switching frequency of the switching signal $V_{PWM}$ in response to the digital pattern $P_N..P_1$. The programmable capacitor 930 is coupled to the integrator 400 and the pattern generator 900 for correlating the time constant of the integrator 400 with the switching frequency. The capacitances of the first programmable capacitor 910 and the second programmable capacitor 930 are controlled by the digital pattern $P_N..P_1$.

Figure 11:
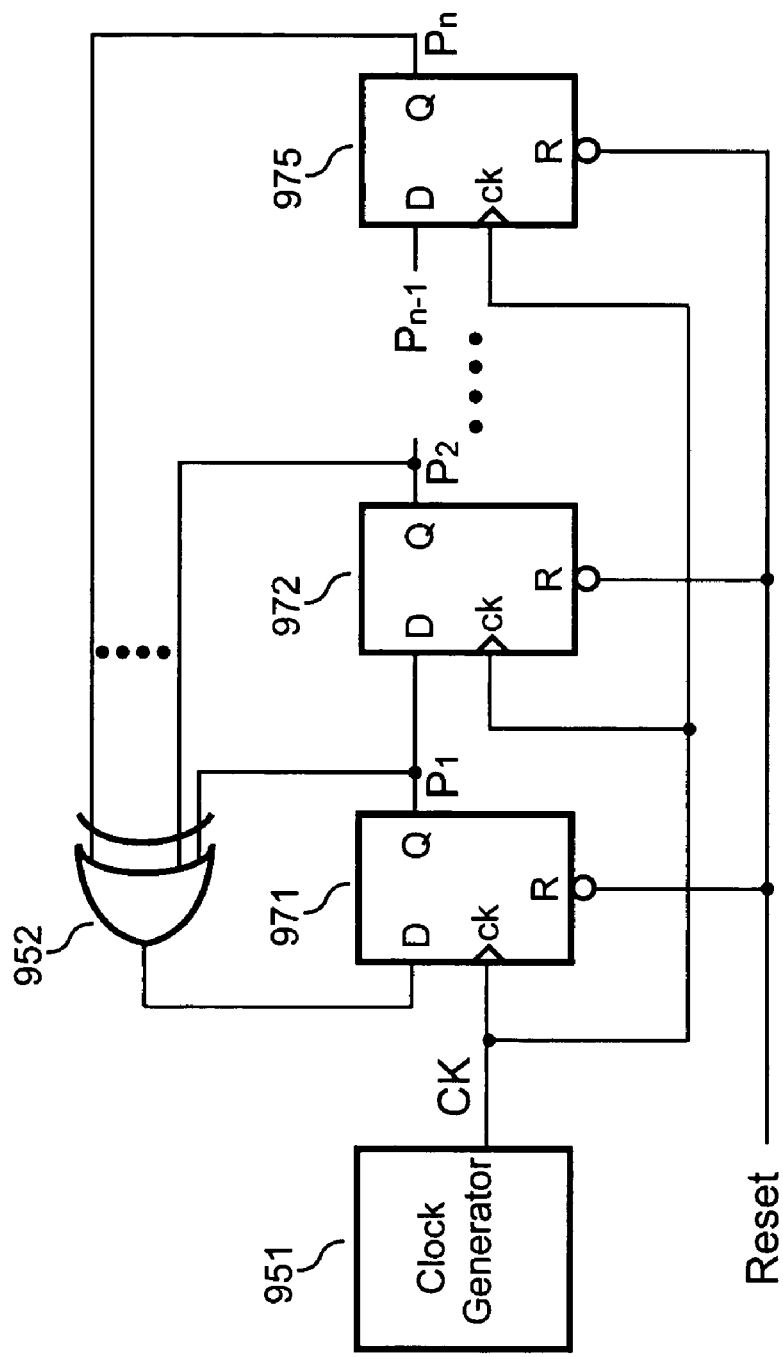
FIG. 11 illustrates one example of the pattern generator for the switching controller of FIG. 2.

FIG. 11 illustrates one example of the pattern generator 900 for the switching controller 70 of FIG. 2. The pattern generator 900 includes a clock generator 951 that generates a clock signal CK, a plurality of registers 971, 972··975, and a XOR gate 952 that develops a linear shift register for generating a linear code in response to the clock signal CK. The inputs of the XOR gate 339 determine the polynomials of the linear shift register and decide the output of the linear shift register. The digital pattern code $P_N..P_1$ can be adopted from the part of the linear code to optimize the application.

Thus, a primary-side-control power converter having a switching controller using frequency hopping and voltage and current control loops has been described. Furthermore, in the foregoing specification, the invention has been described with reference to specific exemplary embodiments and implementations thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A power converter comprising:
    a switch, responsive to a switching signal, to control electrical power in the power converter; and
    a controller to generate the switching signal and to control the switching signal in response to a first feedback signal associated with a voltage control loop and a second feedback signal associated with a current control loop;
    wherein the controller includes a pattern generator to generate a digital pattern and the controller uses the digital pattern for use in generating the switching signal as a frequency-hopping switching signal to the switch.

2. The power converter of claim 1, further comprising:
    a transformer to transfer electrical power from a primary-side of the power converter to a secondary-side of the power converter, and wherein the switch is to switch the transformer.

3. The power converter of claim 2, wherein the current control loop limits the peak current flowing through the transformer.

4. The power converter of claim 3, wherein the current control loop controls an average value of a secondary-side current in the power converter.

5. The power converter of claim 2, wherein the transformer includes an auxiliary winding, a primary winding, and a secondary winding, and wherein the switch controls electrical power flowing through at least the primary winding.

6. The power converter of claim 5, wherein the controller generates the first feedback signal by sampling a voltage from the auxiliary winding of the transformer and a discharge time of the transformer.

7. The power converter of claim 6, further comprising:
    a sense circuit to sense current through the primary winding of the transformer.

8. The power converter of claim 7, wherein the controller generates the second feedback signal by sampling of the sensed current from the sense circuit and the discharge time of the transformer.

9. The power converter of claim 8, wherein the discharge time of the transformer occurs while the switching signal is off.

10. The power converter of claim 5, wherein the voltage control loop limits the peak auxiliary voltage associated with the auxiliary winding.

11. A power converter comprising:
    a transformer to transfer electrical power from a primary-side of the power converter to a secondary-side of the power converter;
    a switch to switch the electrical power transferred by the transformer, the switching being controlled by a switching signal;
    a controller to generate the switching signal and to control the switching signal in response to a first feedback signal by sampling a voltage signal and a discharge-time associated with the transformer during an off time of the switching signal;
    wherein the controller includes a pattern generator to generate a digital pattern and the controller uses the digital pattern for use in generating the switching signal as a frequency-hopping switching signal to the switch.

12. A power converter comprising:
    input terminals and output terminals;
    a transformer to transfer electrical power from the input terminals to the output terminals;
    a switch to control the transformer in response to a switching signal having a switching frequency; and
    a controller to generate the switching signal and to allow the switching frequency to hop from frequency to frequency according to a digital pattern.

13. The power converter of claim 12, wherein the controller adjusts the digital pattern.

14. The power converter of claim 12, wherein the controller generates the switching signal in response to a first feedback signal associated with a voltage control loop and a second feedback signal associated with a current control loop.

15. A method for regulating power in a power converter, comprising:
    receiving electrical power from input terminals;
    controlling a switching signal to regulate the connection of the electrical power to output terminals in response to a first feedback signal associated with a voltage control loop and a second feedback signal associated with a current control loop;
    generating a frequency-hopping switching signal in order to reduce at least electro-magnetic interference (EMI); and
    generating a digital pattern for use in generating the frequency-hopping switching signal.

16. The method of claim 15, further comprising: programming the digital pattern.

17. The method of claim 15, further comprising:
    passing electrical power from a primary-side to a secondary-side of a transformer based on the switching signal.

18. The method of claim 17, further comprising:
    generating the first feedback signal by sampling a voltage from an auxiliary winding of the transformer and a discharge time of the transformer.

19. The method of claim 18, further comprising:
    sensing a current through a primary winding of the transformer.

20. The method of claim 19, further comprising:
    generating the second feedback signal by sampling of sensed current and the discharge time of the transformer.

21. The method of claim 20, wherein the discharge time of the transformer occurs when the switching signal is off.

22. A power converter comprising:
    input terminals and output terminals;
    a transformer to transfer electrical power from the input terminals to the output terminals;

a switch to switch the transformer in response to a switching signal having a switching frequency; and a controller to generate the switching signal in response to a first feedback signal associated with a voltage control loop and a second feedback signal associated with a current control loop in the primary-side of the transformer;

wherein the controller includes a pattern generator to generate a digital pattern and the controller uses the digital pattern for use in generating the switching signal as a frequency-hopping switching signal to the switch.

23. The power converter of claim 22, wherein the voltage control loop provides voltage-loop frequency compensation and the current control loop provides current-loop frequency compensation.

24. The power converter of claim 22, wherein the controller comprises:

a first waveform detector to generate the first feedback signal and a discharge-time signal of the transformer;

a second waveform detector and an integrator to generate the second feedback signal;

a first error amplifier and a second error amplifier for amplifying the first feedback signal and the second feedback signal, respectively;

an oscillator to generate a pulse signal and a timing signal in response to an output of the second error amplifier;

a peak-current limiter to limit a sensed current signal; and a PWM circuit to generate the switching signal in response to the pulse signal, an output of the first error amplifier, and an output of the peak-current limiter.

25. The power converter of claim 24, wherein the controller further comprises:

a programmable current source to provide temperature compensation and to generate a programmable current in response to a temperature of the controller.

26. The power converter of claim 25, wherein the controller further comprises:

a first programmable capacitor coupled to the oscillator and the pattern generator for modulating the switching frequency in response to the digital pattern; and a second programmable capacitor coupled to the integrator and the pattern generator for correlating the time constant of the integrator with the switching frequency; wherein the capacitances of the first programmable capacitor and the second programmable capacitor are controlled by the digital pattern.

27. The power converter of claim 26, wherein the time constant of the integrator correlates with a switching period of the switching signal.

28. The power converter of claim 24, wherein the first waveform detector generates the first feedback signal by sampling a voltage signal from an auxiliary winding of the transformer, and generates the discharge-time signal using a discharge-time of a secondary-side switching current of the transformer.

29. The power converter of claim 28, wherein the integrator integrates an average-current signal with the discharge-time signal.

30. The power converter of claim 29, wherein the average-current signal is derived from a current-waveform signal integrated with the pulse width of the timing signal.

31. The power converter of claim 30, wherein the pulse width of the timing signal correlates with the switching frequency of the switching signal.

32. A power converter comprising:

a transformer coupled to an input voltage for the power converter;

a switch to switch electrical power flowing through the transformer;

a sense device coupled to the transformer to sense at least current through a primary winding of the transformer; and a controller coupled to the transformer, the controller to provide a switching signal to the switch for regulating output power for the power converter, and to control the switching signal based on a first feedback signal associated with a first control loop and a second feedback signal associated with a second control loop in the primary-side of the power converter;

wherein the controller includes a pattern generator to generate a digital pattern and the controller uses the digital pattern for use in generating the switching signal as a frequency-hopping switching signal to the switch.

33. The power converter of claim 32, wherein the switching signal has a minimum on-time once the switching signal is enabled in order to ensure a minimum value of the discharge-time for sampling the voltage signal.

34. The power converter of claim 32, wherein the first control loop includes a voltage control loop and the second control loop includes a current control loop.

35. The power converter of claim 32, wherein the controller generates the first feedback signal and a discharge-time signal by sampling of a voltage associated with the transformer and a discharge-time of the transformer during an off time the switching signal.

36. The power converter of claim 35, wherein the controller generates the second feedback signal in response to the discharge-time signal and sensed current from the sense device, and controls the switching frequency of the switching signal in response to the second feedback signal.

37. The power converter of claim 32, wherein the controller comprises:

a first waveform detector coupled to the transformer, the first waveform detector to generate the first feedback signal and the discharge-time signal by sampling of a voltage signal from an auxiliary winding of the transformer, wherein the discharge time signal corresponds to the discharge time of the secondary-side switching current of the transformer;

a second waveform detector and an integrator, the second waveform detector and integrator to generate the second feedback signal by integrating an average-current signal with the discharge-time signal;

a first error amplifier and a second error amplifier to amplify the first feedback signal and the second feedback signal, respectively;

an oscillator coupled to the second error amplifier to generate a pulse signal and the timing signal in response to an output of the second error amplifier;

a peak-current limiter coupled to the sense device to limit a maximum value of the current signal; and a PWM circuit to generate the switching signal in response to the pulse signal, an output of the first error amplifier, and an output of the peak-current limiter.

38. The power converter of claim 37, wherein the second waveform detector generates the average-current signal by integrating a current-waveform signal with the pulse width of the timing signal, wherein the current-waveform signal is a measured current signal.

39. The power converter of claim 37, wherein said integrator comprises:
- a first V-to-I converter including a first operational amplifier, a first timing resistor, and a first group of transistors, wherein the first V-to-I converter generates a first int-charge current in response to said current-waveform signal;
- a first timing capacitor to produce a first integrated signal;
- a fast switch having a first terminal supplying the first mt-charge current and a second terminal coupled to the first timing capacitor, and wherein the timing signal controls the on/off of the first switch;
- a second switch connected in parallel with the first timing capacitor for discharging the first timing capacitor;
- a third switch;
- a second output capacitor to produce an average-current signal by sampling the first integrated signal through the third switch;
- a second V-to-I converter including a second operational amplifier, a second timing resistor, and a second group of transistors, and wherein the second V-to-I converter generates a second mt-charge current in response to the average-current signal;
- a third timing capacitor to produce a second integrated signal;
- a fourth switch having a first terminal supplying the second mt-charge current and a second terminal coupled to the third timing capacitor, and wherein said discharge-time signal controls the on/off of the fourth switch;
- a fifth switch connected in parallel with the third timing capacitor for discharging the third timing capacitor;
- a sixth switch; and
- a fourth output capacitor to produce the second feedback signal by sampling the second integrated signal through the sixth switch.

40. The power converter of claim 37, wherein the second waveform detector comprises:
- a peak detector to generate a peak-current signal by measuring a peak value of the current signal;
- a third capacitor to hold the peak-current signal;
- a second output capacitor to produce the current-waveform; and
- a switch to conduct the peak-current signal to the second output capacitor.

41. The power converter of claim 37, wherein the pulse signal determines the switching frequency of the switching signal.

42. The power converter of claim 41, wherein the controller further comprises:
- a programmable current source coupled to an input of the first waveform detector for temperature compensation, and wherein the programmable current source is-generates a programmable current in response to a temperature of the controller.

43. The power converter of claim 42, wherein the controller further comprises:
- a first programmable capacitor coupled to the oscillator and the pattern generator for modulating the switching frequency in accordance with the digital pattern; and
- a second programmable capacitor coupled to the integrator and the pattern generator to correlate a time constant of the integrator with the switching frequency, and wherein the capacitances of the first programmable capacitor and the second programmable capacitor are dictated by the digital pattern.

44. The power converter of claim 43, wherein the time constant of the integrator correlates with the switching period of the switching signal.

45. The power converter of claim 43, wherein the pattern generator comprises:
- a clock generator to generate a clock signal; and
- a register to generate the digital pattern in response to the clock signal.

46. The power converter of claim 37, wherein the oscillator comprises:
- a first V-to-I converter to generate a first charge current, a discharge current, and a second charge current in accordance with an output of the second error amplifier, and wherein the first V-to-I converter includes a first operational amplifier, a first oscillator resistor, and a first group of transistors;
- a first oscillator capacitor;
- a first switch having a first terminal supplying the said first charge current and a second terminal coupled to the first oscillator capacitor;
- a second switch having a first terminal coupled to the first oscillator capacitor and a second terminal driving the discharge current;
- a first comparator having a non-inverting input coupled to the first oscillator capacitor, and wherein the first comparator generates the pulse signal;
- a third switch having a first terminal supplying a high-threshold voltage and a second terminal coupled to an inverting input of the first comparator;
- a fourth switch having a first terminal supplying a low-threshold voltage and a second terminal coupled to the inverting input of the first comparator;
- an inverter having an input coupled to an output of the first comparator for producing an inverse pulse signal and wherein the pulse signal turns on/off of the second switch and the fourth switch, and wherein the inverse pulse signal turns on/off the first switch and the third switch;
- a third resistor to generate a trip-point voltage in response to the second charge current;
- a second oscillator capacitor;
- a fifth switch connected in parallel with the second oscillator capacitor; and
- a second comparator having an inverting input coupled to the second oscillator capacitor and a non-inverting input coupled to the trip-point voltage, and wherein the second comparator generates the timing signal.

47. The power converter of claim 37, wherein the first waveform detector comprises:
- a sample-pulse generator to generate a sample-pulse signal;
- a threshold generator to generate a threshold signal that adds to the voltage signal to produce a level-shift signal;
- a first capacitor and a second capacitor to provide a first-hold voltage and a second-hold voltage;
- a first signal generator to generate a first sample signal and a second sample signal, wherein the first sample signal and the second sample signal are used for alternately sampling the voltage signal;
- a buffer amplifier to generate a hold signal from a higher voltage of the first-hold voltage and said second-hold voltage;
- a first output capacitor to generate the first feedback signal by sampling the hold signal; and
- a second signal generator to generate the discharge-time signal.

48. The power converter of claim 47, wherein the second signal generator generates the discharge-time signal such that it is enabled as the switching signal is disabled, and wherein after the delay time the discharge-time signal is disabled once the level-shift signal is lower than the first feedback signal, and wherein the discharge-time signal is disabled as long as the switching signal is enabled.

49. The power converter of claim 48, wherein the first waveform detector samples the voltage signal to generate an end voltage used for the first feedback signal, and wherein the end voltage is sampled and measured instantly before the secondary-side switching current falls to zero.

50. The power converter of claim 47, wherein the first signal generator alternately generates the first sample signal and the second sample signal in response to the sample-pulse signal during an enable period of the discharge-time signal.

51. The power converter of claim 50, wherein the first signal generator inserts a delay time at a beginning of the discharge-time signal and wherein the first sample signal and second sample signal are disabled during the period of the delay time.

* * * * *

UNITED STATES PATENT AND TRADEMARK OFFICE
CERTIFICATE OF CORRECTION

PATENT NO. : 7,259,972 B2 Page 1 of 1
APPLICATION NO. : 10/959188
DATED : August 21, 2007
INVENTOR(S) : Ta-yung Yang It is certified that error appears in the above-identified patent and that said Letters Patent is hereby corrected as shown below:

In claim 35, column 18, line 32, "off time the switching" should read --off time of the switching--.

In claim 39, column 19, line 10, "mt-charge" should read --int-charge--.

In claim 39, column 19, line 22, "mt-charge" should read --int-charge--.

In claim 39, column 19, line 27, "mt-charge" should read --int-charge--.

In claim 42, column 19, lines 54-55, "is-generates" should read --generates--.

Signed and Sealed this

Fourth Day of December, 2007

JON W. DUDAS
*Director of the United States Patent and Trademark Office*